(12) United States Patent
Leiter et al.

(10) Patent No.: US 12,206,297 B2
(45) Date of Patent: Jan. 21, 2025

(54) BRAKE OR STEERING SYSTEM HAVING REDUNDANT COMPONENTS

(71) Applicant: HL MANDO CORPORATION, Pyeongtaek-si (KR)

(72) Inventors: Ralf Leiter, Mendig (DE); Axel Kunkel, Stutensee (DE)

(73) Assignee: HL MANDO CORPORATION, Pyeongtaek si (KR)

( * ) Notice: Subject to any disclaimer, the term of this patent is extended or adjusted under 35 U.S.C. 154(b) by 462 days.

(21) Appl. No.: 17/440,999

(22) PCT Filed: Feb. 12, 2020

(86) PCT No.: PCT/KR2020/001940
§ 371 (c)(1),
(2) Date: Sep. 20, 2021

(87) PCT Pub. No.: WO2020/197089
PCT Pub. Date: Oct. 1, 2020

(65) Prior Publication Data
US 2022/0166292 A1    May 26, 2022

(30) Foreign Application Priority Data
Mar. 25, 2019 (DE) .................. 10 2019 204 035.7

(51) Int. Cl.
*H02K 11/30* (2016.01)
*B60T 13/74* (2006.01)
(Continued)

(52) U.S. Cl.
CPC ............ *H02K 13/006* (2013.01); *B60T 13/74* (2013.01); *B62D 5/0484* (2013.01); *H02K 11/30* (2016.01); *H02K 2213/06* (2013.01)

(58) Field of Classification Search
CPC ........ H02K 16/02; H02K 23/00; H02K 23/36; H02K 11/30; H02K 11/33; H02K 2213/06
See application file for complete search history.

(56) References Cited

U.S. PATENT DOCUMENTS 8,222,776 B2 * 7/2012 Tanaka .................. H02P 7/0094
310/67 R
8,471,431 B2 * 6/2013 Harada .................. H02K 23/20
310/239

(Continued)

FOREIGN PATENT DOCUMENTS

CN    102132474 A    7/2011
JP    H08116655 A  *  5/1996

(Continued)

OTHER PUBLICATIONS

JP-H08116655 A machine translation Nov. 4, 2023.*

(Continued)

*Primary Examiner* — Leda T Pham
(74) *Attorney, Agent, or Firm* — LEE, HONG, DEGERMAN, KANG & WAIMEY (57) ABSTRACT

The present invention relates to a brake or steering system including an actuator (6, 7), and an electromotor arrangement (10) comprising a rotatably mounted shaft (12) for driving the actuator (6, 7), a first pair of brushes (14), a second pair of brushes (16), a commutator assembly (21, 22, 24) arranged on the shaft, the commutator assembly being in contact with the first pair of brushes (14) and the second pair of brushes (16), a coil assembly (30) electrically connected to the commutator (21, 22, 24) assembly, and at least one permanent magnet cooperating with the coil assembly (30) to provide a rotational movement of the shaft (12) when the coil assembly (30) is energized.

14 Claims, 5 Drawing Sheets

(51) Int. Cl.
*B62D 5/04* (2006.01)
*H02K 13/00* (2006.01)

(56) References Cited

U.S. PATENT DOCUMENTS

| | | | |
|---|---|---|---|
| 9,941,651 B1* | 4/2018 | Coody | ................... H01R 39/60 |
| 2002/0005313 A1 | 1/2002 | Yamazaki | |
| 2003/0057788 A1* | 3/2003 | Natsuhara | .............. H02K 23/64 |
| | | | 310/179 |
| 2017/0183009 A1 | 6/2017 | Isono et al. | |

FOREIGN PATENT DOCUMENTS

| | | |
|---|---|---|
| JP | 2012-79433 A | 4/2012 |
| JP | 2018-88826 A | 6/2018 |
| JP | 2018088826 A * | 6/2018 |

OTHER PUBLICATIONS

JP-2018088826-A machine translation May 18, 2024.*
International Search Report (PCT/ISA/210) issued in PCT Application No. PCT/KR2020/001940 dated Jun. 4, 2020 with English Translation.
Written Opinion (PCT/ISA/237) issued in PCT Application No. PCT/KR2020/001940 dated Jun. 4, 2020 with English Translation.

* cited by examiner

BRAKE OR STEERING SYSTEM HAVING REDUNDANT COMPONENTS

CROSS-REFERENCE OF RELATED APPLICATIONS

This application is the U.S. National Phase under 35 U.S.C. § 371 of International Patent Application No. PCT/KR2020/001940, filed on Feb. 12, 2020, which claims the benefit of German Patent Application No. 10 2019 204 035.7, filed on Mar. 25, 2019, the entire disclosures of each are incorporated by reference herein.

TECHNICAL FIELD

The present invention relates to a brake or steering system comprising an actuator and an electromotor arrangement having at least two redundant components.

BACKGROUND ART

A brake-by-wire system may eliminate the need for hydraulics by using motors to actuate brake callipers, in comparison to the currently existing technology where the system is designed to provide braking effort by building hydraulic pressure in brake lines. For instance, electric park brakes may be used in passenger vehicles to hold the vehicle stationary on grades and flat roads. With electric park brakes, the driver activates a holding mechanism with a button and the brake pads are then electrically applied onto the brakes. This is usually accomplished by a controller and an actuator mechanism. There are different actuator mechanisms that are currently in production, such as cable puller systems and calliper integrated systems. Instead of or in addition to hydraulic brakes electric brakes are also increasingly used for braking (slowing down) the vehicle or regenerative braking.

There is an ongoing need to improve safe and secure operation of electrically activated/assisted brakes.

A steer-by-wire system may provide steering control to a vehicle with fewer mechanical components/linkages between the steering wheel and the wheels of the vehicle. The control of the wheels' direction may be established through at least one electric motor which can be actuated by an electronic control unit monitoring the steering wheel inputs from the driver.

Electric power assisted steering or motor-driven power steering uses an electric motor to assist the driver of a vehicle with steering. Sensors detect the position and torque of the steering column, and an electronic control unit applies assistive torque via the motor, which connects to either the steering gear or steering column. This allows varying amounts of steering assistance to be applied depending on driving conditions.

There is an ongoing need to improve safe and secure operation of electrically activated/assisted steering systems.

DISCLOSURE

Technical Problem

It is therefore an object of the present invention to further increase safety and security of brake and steering systems.

Further, it may be advantageous to reduce wear of components in such systems.

It is a further object of the present invention to provide a system having a number of redundant components that take over or replace non-functioning components in case of failure.

Technical Solution

The present invention has been made to solve at least one of the above mentioned objects.

The invention is defined by the brake system of claim 1. Further developments and embodiments are described in the dependent claims and the following description.

In accordance with claim 1, there is provided a brake system or a steering system including an actuator, and an electromotor arrangement. The electromotor arrangement comprises a rotatably mounted shaft for driving the actuator, a first pair of brushes, a second pair of brushes, a commutator assembly arranged on the shaft, the commutator assembly being in contact with the first pair of brushes and the second pair of brushes, a coil assembly electrically connected to the commutator assembly, and at least one permanent magnet cooperating with the coil assembly to provide a rotational movement of the shaft when the coil assembly is energized.

Due to the fact that the commutator assembly is electrically connected to both the first pair and the second pair of brushes, the electromotor arrangement has a redundant pair of brushes. Therefore, if one of the first and second pair of brushes has a failure, the other one can take over its function and can still provide an electrical current to the coil assembly. The electromotor arrangement is used in combination with an actuator of a brake system or a steering system of a vehicle which both require a particular safe and secure operation.

The coil assembly can include a plurality of coils, e.g. at least 1, 2, 3, 4, 5, 6, 7, 8, 9, 10 or even more. The coils can be arranged circumferentially around the shaft, and preferably at the same axial position relative to the shaft. In some instances, the coil assembly can be rotationally fixed to the shaft. For instance, the coils are arranged circumferentially on the shaft.

In some embodiments, the electromotor arrangement includes a first controller electrically connected to the first pair of brushes for energizing the first pair of brushes. Additionally or alternatively, the first controller is electrically connected to the second pair of brushes for energizing the second pair of brushes. Energizing a component means in the context of the present disclosure that a current flows through the respective component.

To further increase redundancy, the electromotor arrangement may further comprise a second controller electrically connected to the second pair of brushes for energizing the second pair of brushes. Additionally or alternatively, the second controller is also electrically connected to the first pair of brushes for energizing the first pair of brushes.

The first controller and/or the second controller may be configured such that the first and second pair of brushes are energized in parallel or independently of each other. For instance, the first controller is configured to alternatingly or simultaneously energize the first pair of brushes and the second pair of brushes. Likewise, the second controller may be configured to alternatingly or simultaneously energize the first pair of brushes and the second pair of brushes.

The electromotor arrangement may comprise a first direct current source for energizing the first controller and/or a second direct current source for energizing the second controller. By providing two different current sources one of the controllers can still operate if one of the current sources has a failure.

The first and second controllers may be configured for an alternating operation. Stated otherwise, first the first controller energizes the first and/or second pair of brushes and thereafter, the second controller energizes the first and/or second pair of brushes. In this configuration control of the electromotor assembly is performed alternatingly by two different controllers which may reduce wear of the components used.

In other embodiments, the first and second controllers may be configured for a concurrent operation. In this configuration, both controllers are simultaneously used to energize the brushes. In this way, the current provided by each controller is lower than if one controller energizes the brushes resulting in less mechanical stress and electrical loading of the energized components.

The first and second controllers may be communicatively connected to each other, e.g. via a bus system, which may comprise bus lines and redundant bus lines. This may facilitate concurrent or alternating operation of the controllers. One of the controllers may be configured to detect if the other controller has a malfunction, a failure or a defect. In this case, the controller is configured to take over function and control of the other controller.

Typically, by energizing the first pair of brushes and/or the second pair of brushes the commutator assembly and the coil assembly are energized. Thus, the coil assembly can be energized by at least one of the controllers and at least one of the pairs of brushes mentioned above. In case of a malfunction of one of the components, the other one may take over its functions. Due to the duplicated controllers and the doubled connections between the pairs of brushes and the controllers the electromotor arrangement has a plurality of redundant components, which improves the overall safety of the electromotor arrangement.

According to some embodiments, the commutator assembly comprises one single commutator. In this case, the first pair of brushes and the second pair of brushes contact this single commutator. The single commutator may be electrically connected to each coil of the coil assembly. The first pair of brushes and the second pair of brushes may be disposed at the same axial location on the shaft. In this case, the first pair of brushes and the second pair of brushes may be arranged at interval of 90° with respect to a central axis of the shaft. Alternatively, the first pair of brushes and the second pair of brushes are axially offset from each other.

Alternatively, the commutator assembly comprises a first commutator arranged on the shaft, the first commutator being in contact with the first pair of brushes, and a second commutator arranged on the shaft, the second commutator being in contact with the second pair of brushes.

By providing two commutators the redundancy of the system can be further increased resulting in less wear and a higher level of safety. Usually, the first and second commutators are disposed on different axial locations on the shaft. In particular, there is no axial overlap of the first and second commutators.

Optionally, each of the coils is electrically connected to both the first and second commutators. Alternatively, each coil is assigned a different commutator. For instance, a first group of coils is assigned to the first commutator and a second group of coils is assigned to the second commutator.

Furthermore, the single commutator, the first commutator and/or the second commutator may comprise a plurality of commutator segments, e.g. at least two, which are disposed circumferentially at the same axial location on the shaft. The commutator segments may be arc-shaped or C-shaped. Commutator segments are generally known to the skilled person.

Optionally, the electromotor arrangement includes an electrically insulative member insulating the first commutator from the second commutator. The insulative member may be an annular member, preferably a ring made of an insulative material such as plastic. The insulative member may be mounted on the shaft. The insulative member may be axially disposed between the first commutator and the second commutator.

Optionally, the first and second commutators are disposed on the same side of the shaft relative to the coil assembly. For instance, the first and second commutators are disposed axially adjacent to each other. Alternatively, the first and second commutators are disposed on opposite sides of the shaft relative to the coil assembly.

The first commutator may have a first outer diameter and the second commutator may have a second outer diameter. Further, the first commutator may have a first inner diameter and the second commutator may have a second inner diameter. The first diameter (inner and/or outer) and/or the second diameter (inner and/or outer) may each have a constant value along the shaft. In some embodiments, the first outer or inner diameter equals the second outer or inner diameter. In other embodiments, the first outer or inner diameter differs from the second outer or inner diameter. For instance, the first outer or inner diameter is greater than the second outer or inner diameter.

The first commutator may be axially disposed between the coil assembly and the second commutator. The electrical connections between the second commutator and the coil assembly may be guided through a portion of the first commutator. For instance, the electrical connections are embedded into slots formed in the shaft. The first commutator may be arranged radially above the slots.

In a preferred embodiment, the single commutator, the first commutator and/or the second commutator are electromechanical commutators.

As indicated above, in some embodiments, the first pair of brushes and the second pair of brushes are alternatingly energized. In these instances, the brushes and the first and second commutators may only be supplied with current in half the time. In other embodiments, all the brushes and the commutators are energized concurrently. In this case, the brushes and the commutators may be energized using only half of the current that would be required when only one pair of brushes is energized. In both situations (concurrent current supply and alternating current supply), the total current flowing through the brushes and the commutators over a certain amount of time may be reduced by 50% thereby reducing wear of the respective components. Thus, not only is a redundant system provided, the electromotor arrangement is also better resistant to wear.

The number of permanent magnets may coincide with the number of coils. Further, the permanent magnet may be mounted on the rotatable shaft. A stator assembly may be provided that includes the coil assembly. The coil assembly may encompass (surround) the at least one permanent magnet. An example for such a configuration of the permanent magnet and the coil assembly may be found in US 2006/0043817 A1. In other embodiments, the coil assembly is rotationally fixed to the rotatable shaft. A stator assembly may be provided that includes the at least one permanent magnet. Further, the permanent magnet may encompass the coil assembly. An example for such a configuration of the permanent magnet and the coil assembly may be found in JP 2002-354882 A.

The brake system may include a brake assembly, wherein the actuator is provided for actuating the brake assembly. In some examples, the brake assembly comprises a brake calliper and a brake disc. The brake system may in particular be or comprise an electric park brake. Similarly, the steering system may include a steering assembly, wherein the actuator is provided for actuating the steering assembly.

The actuator may be driven in accordance with the rotation of the shaft. The actuator may be mechanically coupled to the electromotor arrangement. In some examples, the actuator may be a linear actuator that generates a linear motion from the rotating shaft. As indicated above, there are different actuator mechanisms that are conceivable, such as cable puller systems and calliper integrated systems. The invention is therefore not limited to a specific actuator mechanism.

Advantageous Effects

The present invention has been made in particular to further improve safety and security of electric brake systems and electric steering systems. In addition, by providing redundant components that are mechanically stressed during operation of the brake system or steering system, such as the brushes and the commutators, the lifetime of the respective system can be elongated.

DESCRIPTION OF DRAWINGS

Various objects and advantages of the present invention will become apparent to those skilled in the art from the following detailed description of embodiments, when read in light of the accompanying drawings.

BEST MODE

In the following, recurring and similar features in this and in the subsequent representations are provided with the same reference numerals.

Figure 1:
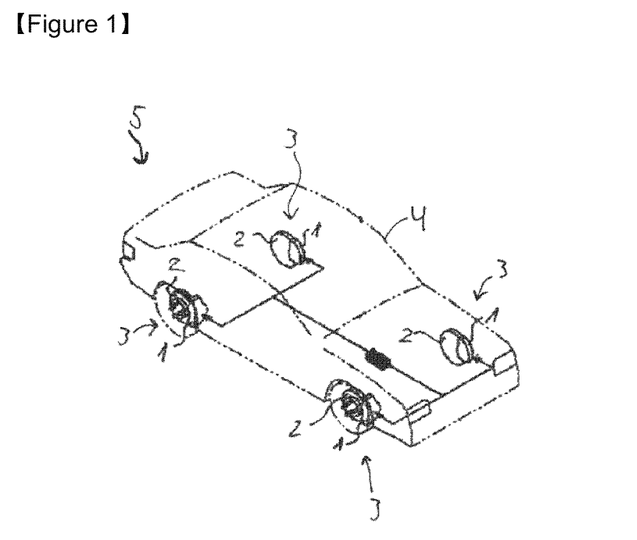
FIG. 1 shows schematically a perspective view of a vehicle with a brake system.

FIG. 1 illustrates a vehicle 4 that is equipped with a brake system 5 and a steering system (not shown). The vehicle 4 shown in FIG. 1 has four wheels and a wheel brake assembly 3 for each of the wheels. FIG. 1 shows a brake calliper 1 and a brake disc 2 of each of these wheel brake assemblies 3, which are of the disc brake type. They may be activated not only by hydraulic pressure of a brake fluid but also electrically so that an ordinary hydraulic service brake and an electric parking brake are combined in the brake system 5 of the vehicle 4. It may be also envisaged that the wheel brakes are solely electrically activated, that is without using a hydraulic system.

Figure 2:
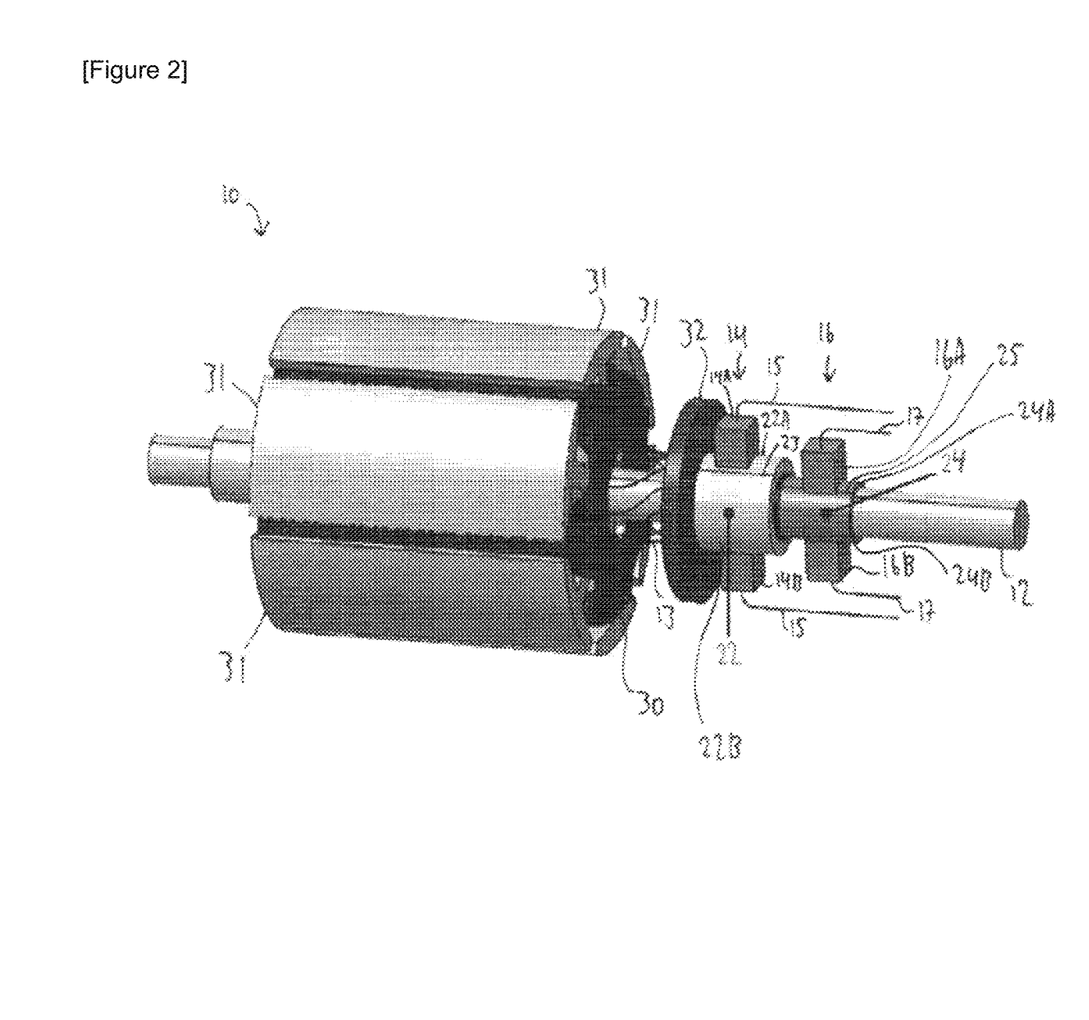
FIG. 2 shows schematically a part of an electromotor arrangement.
Figure 3:
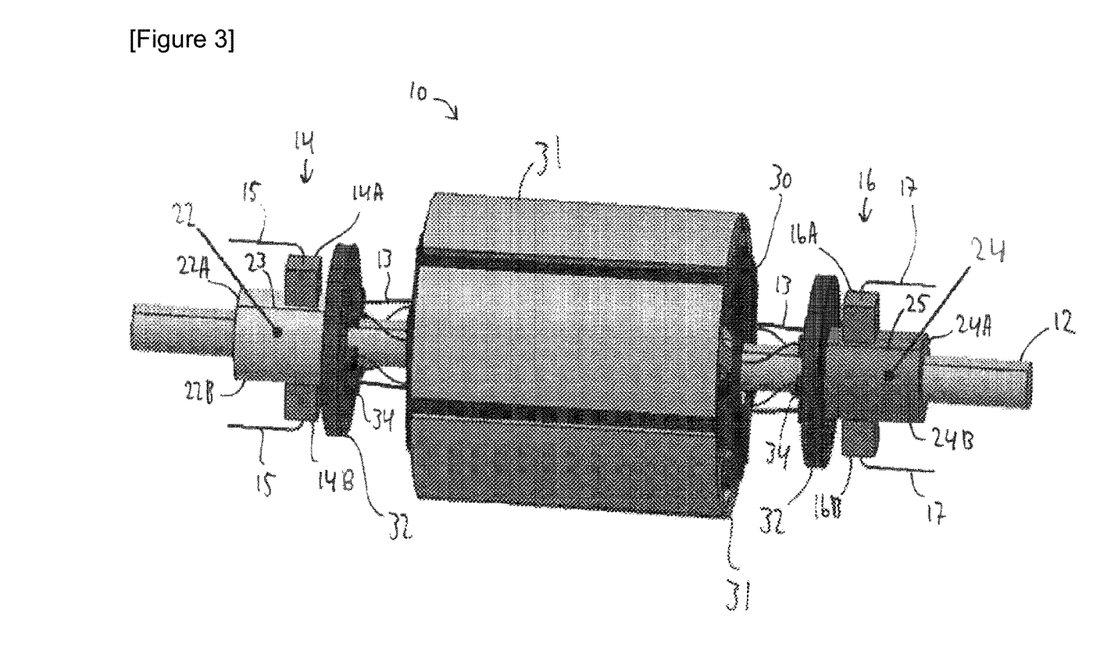
FIG. 3 shows schematically a part of a further electromotor arrangement.

For electrically activating the brake assemblies 3 the brake system includes four linear actuators 6, 7 (see FIG. 5) each comprising an electromotor arrangement 10 that is schematically shown in FIGS. 2 and 3.

Figure 4:
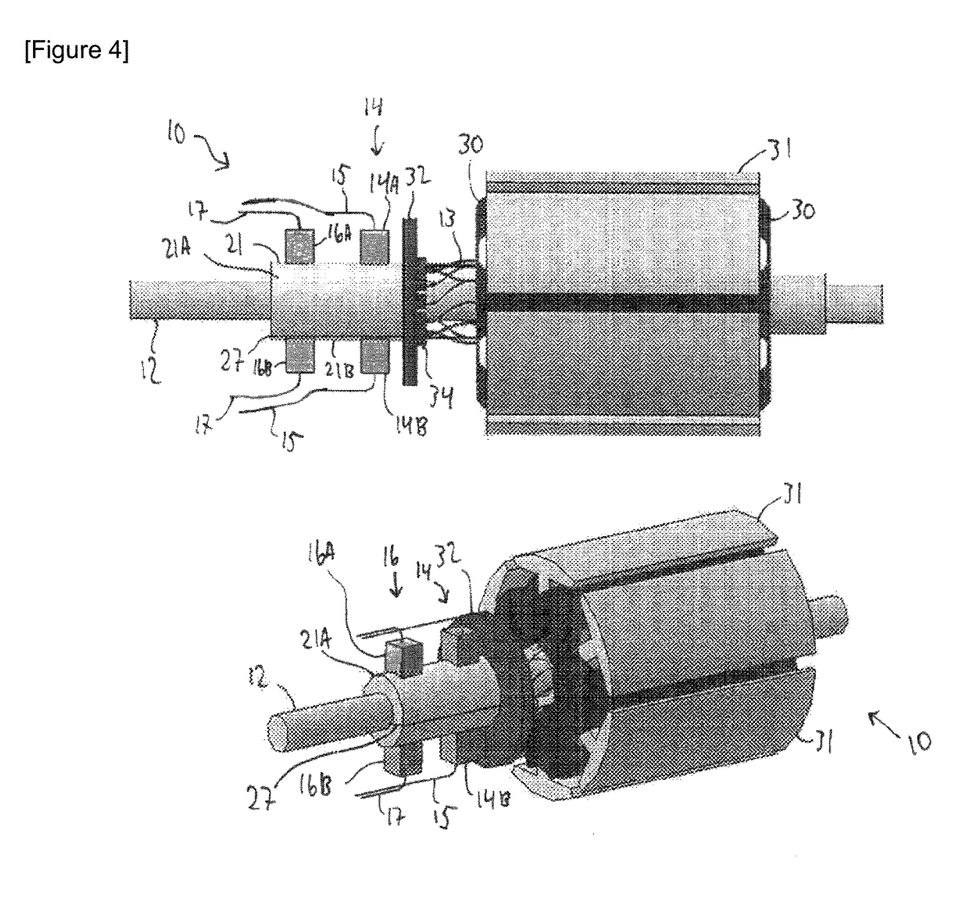
FIG. 4 shows schematically a part of a further electromotor arrangement.

In FIGS. 2, 3 and 4 an electromotor arrangement 10 for an actuator of the brake system 5 is shown. The electromotor arrangement 10 comprises a rotatably mounted shaft 12 on which a plurality of coils 30 are mounted in a circumferential manner. In the example depicted, six coils 30 are envisaged. The coils 30 are each coupled with at least one armature 31 extending radially from the shaft 12. The coils 30 are arranged at the same axial position of the shaft 2. Furthermore, the electromotor arrangement 10 comprises a substantially cylindrical outer stator assembly (not shown) which is arranged opposite to the armatures 31 and the coils 30 and surrounds the armatures 31 and the coils 30. The outer stator comprises a plurality of permanent magnets fixed thereto. An air gap is interposed between the permanent magnets and the armatures 31 as it is common in electromotors. The permanent magnets cooperate with the coils 30 to provide a rotational movement of the shaft 12 when the coils 30 are energized. The electromotor arrangement 10 includes a direct current (DC) brush motor and comprises to this end a first pair of brushes 14 and a second pair of brushes 16. The brushes 14A, 14B of the first pair of brushes 14 and the brushes 16A, 16B of the second pair of brushes 16 may be composed of conductive materials including, for example, carbonaceous materials, graphite materials, electrographite materials, and metal graphite materials. The brushes 14A, 14B and the brushes 16A, 16B may be arranged at an interval of 180° with respect to a central axis of the shaft 12.

The electromotor arrangement 10 may have at least one or two windings and two, four or six poles. In a preferred embodiment, the electromotor arrangement 10 has one winding and four poles.

Referring to FIGS. 2 and 3, a first electro-mechanical commutator 22 and a second electro-mechanical commutator 24 are mounted on the shaft 12, being in contact with the first pair of brushes 14 and the second pair of brushes 16, respectively.

FIG. 4, on the other hand, shows one single electro-mechanical commutator 21 that is mounted on the shaft 12 being in contact with both the first pair of brushes 14 and the second pair of brushes 16.

The commutators 21, 22, 24 have a cylindrical shape with a constant outer diameter and can be slid onto the shaft 12 when assembling the electromotor arrangement 10. Each commutator 21, 22, 24 may comprise a plurality of commutator pieces (also known as segments) that are electrically insulated from each other and arranged circumferentially on the shaft 12. For example, each commutator 21, 22, 24 may include primary and secondary commutator pieces 21A, 21B, 22A, 22B, 24A, 24B, each of which composed of a substantially arc-shaped or C-shaped conductive material. The primary and secondary commutator pieces are electrically insulated by two opposing insulating portions 23, 25, 27 respectively. The insulating portions 23, 25, 27 extend axially along the shaft 12.

The first pair and the second pair of brushes 14, 16 may be urged towards the commutators 21, 22, 24 by means of springs. The springs may be secured at an inner wall of a housing 11 (see FIG. 5) of the electromotor arrangement 10. The springs may be composed of an electrically insulative material or coated therewith.

The coils 30 may be connected to the commutators 21, 22, 24 via dedicated wiring 13, e.g. pigtails, and at least one connector disc 32 mounted on the shaft. The wiring 13 is plugged into the disc 32 via a plurality of connectors 34.

Further, dedicated wiring is envisaged to electrically connect the connectors 34 with the corresponding commutators 21, 22, 24 (not shown).

More specifically, each coil 30 may be electrically connected to the single commutator 21 or the first commutator 22 and/or the second commutator 24 via wiring 13. The brushes 14, 16 make contact with the surface of the commutator 22, 24 in order to supply the DC current to the coils 30. When the DC current is allowed to flow to the commutator 21, 22, 24 via the brushes 14, 16, the DC current flows through the coils 30 via at least one of the commutators 21, 22, 24 (see below). Torque is generated on the armatures 31 in accordance with the action of the magnetic flux which is generated from the coils 30 by the DC current and the magnetic flux of the permanent magnets which intersects the armatures 31. The shaft 12 and the components mounted thereon are rotated about the central axis of the shaft 12.

The main difference between the electromotor arrangements 10 shown in FIGS. 2 and 3 is that in FIG. 2, the first and second commutators 22, 24 are disposed on opposite sides of the coils 30, while in FIG. 3, the first and second commutators 22, 24 are disposed on the same side of the coils 30. Further, as opposed to the electromotor arrangements 10 shown in FIGS. 2 and 3, the electromotor arrangement of FIG. 4 has only one commutator 21.

In FIG. 2, the commutators 22, 24 are disposed adjacent to each other. More specifically, the first commutator 22 is axially disposed between the coils 30 and the second commutator 24. Solely an electrically insulating member 29 is axially disposed between the first commutator 22 and the second commutator 24. In the embodiment shown, the insulating member is a ring 29 made of an insulating plastic material.

Further, in the embodiment shown in FIG. 2, the first commutator 22 has a first outer diameter and a first inner diameter, and the second commutator 24 has a second outer diameter and a second inner diameter. The first outer diameter is larger than the second outer diameter. Furthermore, the first inner diameter is greater than the second inner diameter. In this way, the electrical connections between the second commutator 24 and the coils 30 may be embedded into slots (not shown) formed in the shaft 12. During assembly, the first commutator 22 is mounted on the shaft 12 by sliding and arranged on top of these slots.

Figure 5:
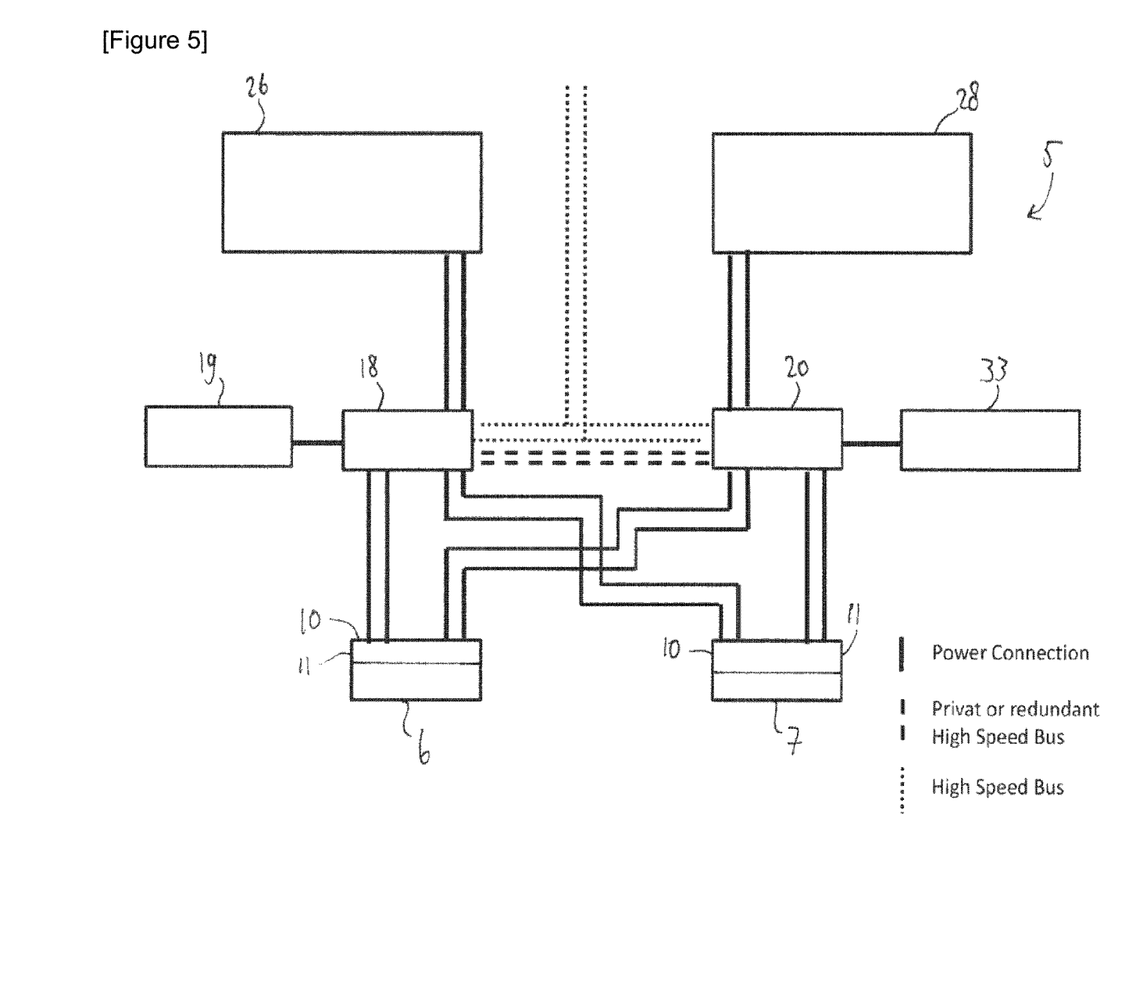
FIG. 5 shows a schematic diagram of a brake system of a vehicle including an actuator and an electromotor arrangement.

FIG. 5 shows a schematic diagram of the brake system 5 including the electromotor arrangement 10 in accordance with FIG. 2 or 3.

In accordance with FIG. 5, a first controller 18 and a second controller 20 are envisaged. The first controller 18 may be a brake ECU (Electronic Control Unit) specially designed for controlling the brake system 5 or a steering ECU designed for controlling the steering system, while the second controller 20 may be an ECU that is originally designed for completing other tasks, such as a gear ECU, an engine ECU, or any other suitable ECU in the vehicle. Suitable in this context means in particular that the unit has Automotive Safety Integrity Level D (ASIL-D). For instance, the gear ECU 20 (also known as transmission ECU) generally uses sensors from the vehicle 4 to calculate how and when to change gears in the vehicle 4 for optimum performance, fuel economy and shift quality. In other embodiments, the first and second controllers 18, 20 are specially designed and configured for controlling the electromotor arrangement 10 of the brake system 5 or the steering system. Thus, in this case both controllers 18, 20 may be brake ECUs or steering ECUs.

In case is the first controller 18 is a brake ECU, the first controller 18 may be connected to an EPB switch 19 (electric park brake switch) that typically disposed on the centre console in the vehicle 4. A driver can activate the electric park brake by pressing the EPB switch 19. A corresponding signal is sent to the first controller 18 to activate the electric park brake. Moreover, the second controller 20 may be connected to a p-lock switch 33 (parking lock switch) that may be activated when the vehicle is parked.

The first and second controllers 18, 20 may be communicatively connected by a bus system comprising a plurality of bus lines. To create a redundant bus system, each of the bus lines is duplicated. For instance, private buses may be envisaged, which can also be hand-shake lines. Via the communication between the first and second controllers 18, 20 using the bus system, it may be decided which of the first and second controllers 18, 20 is used for controlling the electromotor arrangement 10, e.g. for alternating or simultaneous operation of the controllers 18, 20. By using the bus system, one of the controllers 18, 20 may detect a malfunction of the other one. Further, one of the controllers 18, 20 may communicate to the other one that it is not operating properly. In this way, the functioning controller may take over control and functionalities of the malfunctioning controller. As indicated by the dashed lines, the first and second controllers 18, 20 may be connected to further ECUs via the bus system.

Further, a first direct current source 26 for energizing the first controller 18 and a second direct current source 28 for energizing the second controller 20 are envisaged. The current sources 26, 28 may provide a direct current at a voltage of 12 V and/or 24 V and/or 48 V. The current and voltage of the current sources 26, 28 may differ from each other. For instance, the first current source 26 provides a voltage of 12 V, while the second current source 28 may provide a voltage of 48 V.

The design and the connections of the current sources 26, 28 to the controllers 18, 20 are preferably such that current leaks from one current source to the other one are avoided at all times.

The first controller 18 and the second controller 20 are both electrically connected via duplicated dedicated electric lines to at least two electromotor arrangements 10 in order to control and power the electromotor arrangements 10. In particular, the first controller 18 is electrically connected both to the first pair of brushes 14 and the second pair of brushes 16 for energizing the commutators 21, 22, 24 and the coils 30. Likewise, the second controller 20 is electrically connected both to the first pair of brushes 14 and the second pair of brushes 16 for energizing the commutators 21, 22, 24 and the coils 30. The electromotor arrangements 10 are mechanically coupled to a left actuator 6 and a right actuator 7. More particularly, rotary motion of the shafts 12 is converted to linear displacement of the linear actuators 6, 7.

The first and second controllers 18, 20 may be configured such that the first and second pairs of brushes 14, 16 are energized in parallel or independently of each other.

In some instances, by energizing the first pair of brushes 14 and the first commutator 22, all coils 30 are energized at the same time. Similarly, by energizing the second pair of brushes 16 and the second commutator 24, the coils 30 are energized at the same time. In other instances, by energizing the first pair of brushes 14 and the first commutator 22 only a fraction of the coils 30 is energized, e.g. 50%. Similarly, by energizing the second pair of brushes 16 and the second commutator 24, only a fraction of the coils 30 may be energized, e.g. 50%.

Thus, the coils 30 can be energized by at least one of the controllers 18, 20 and at least one of the commutators 21, 22, 24 mentioned above. In case of a malfunction of one of the components, the other one may take over its functions. Due to the duplicated controllers 26, 28 and the doubled connections between the pairs of brushes 14, 16 and the controllers 26, 28 the electromotor arrangement 10 has a highly redundant structure, which improves the overall safety of the brake system 5 or the steering system.

Different controlling scenarios are conceivable. For instance, the first and/or the second controller 18, 20 may be configured for concurrently or alternatingly energizing the first pair of brushes 14 and the second pair of brushes 16 (note that the alternating energy supply still uses direct current).

When the first pair of brushes 14 and the second pair of brushes 16 are alternatingly energized, the brushes 14A, 14B, 16A, 16B can be energized only during 50% of the time. Alternatively, the brushes 14A, 14B, 16A, 16B are energized simultaneously. In this scenario, the brushes 14A, 14B, 16A, 16B may be energized using only half of the current that would be required when only one pair of brushes is energized.

In both scenarios (simultaneous current supply and alternating current supply), the total current flowing through the brushes 14A, 14B, 16A, 16B and the commutators 22, 24—if envisaged—over a certain amount of time may be reduced by 50% thereby reducing wear of the respective components. This may greatly improve the wear resistance of the electromotor arrangement 10 and the brake system 5.

The Failures In Time (FIT) rate of a device is the number of failures that can be expected in one billion ($10^9$) device-hours of operation. By using the proposed brake systems 5 described with reference to FIGS. 1-5 having a high degree of redundancy, the FIT was tested to be less than 10, which meets the high demands posed on brake systems 5.

Even though in the FIGS. 1-5 reference is made to a brake system 5 of a vehicle, the actuator and the electromotor arrangement 10 can also be applied in a steering system of a vehicle. Such a steering system thus includes an actuator 6, 7 and the electromotor arrangement 10 as described above.

It is clear for a skilled person that any features shown in the FIGS. 1-5 may be combined with each other or may be separately claimed as long as they do not contradict each other.

The invention claimed is:

1. A brake or steering system including:
   an actuator;
   an electromotor arrangement comprising:
     a rotatably mounted shaft for driving the actuator,
     a first pair of brushes,
     a second pair of brushes,
     a commutator assembly arranged on the shaft, the commutator assembly being in contact with the first pair of brushes and the second pair of brushes,
     a coil assembly electrically connected to the commutator assembly, and
     at least one permanent magnet cooperating with the coil assembly to provide a rotational movement of the shaft when the coil assembly is energized;
   a first controller electrically connected to the first pair of brushes and the second pair of brushes for energizing each of the respective pairs of brushes, and
   a second controller electrically connected to the second pair of brushes and the first pair of brushes for energizing each of the respective pairs of brushes,
   wherein the first and second controllers are communicatively connected by a bus system comprising a plurality of bus lines.

2. The system of claim 1, wherein:
   the first controller is configured to energize the first pair of brushes and/or the second pair of brushes, and
   the second controller is configured to energize the second pair of brushes and the first pair of brushes.

3. The system of claim 1, wherein the first controller and the second controller are each configured to cause the first pair and the second pair of brushes to be energized in parallel or independently of each other.

4. The system of claim 1, wherein the first controller and the second controller are each configured to independently energize the first pair of brushes and the second pair of brushes concurrently or alternatingly.

5. The system of claim 1, further comprising a first direct current source for energizing the first controller and a second direct current source for energizing the second controller.

6. The system of claim 1, wherein the first controller and the second controller are configured for an alternating operation or a concurrent operation.

7. The system of claim 1, further including a stator assembly having the at least one permanent magnet, wherein the coil assembly is rotationally fixed to the shaft.

8. The system of claim 1, wherein the commutator assembly comprises:
   a first commutator arranged on the shaft, the first commutator being in contact with the first pair of brushes,
   a second commutator arranged on the shaft, the second commutator being in contact with the second pair of brushes,
   wherein the first and second commutators are disposed on different axial locations on the shaft.

9. The system of claim 7, wherein the first and second commutators are disposed on the same side of the shaft relative to the coil assembly.

10. The system of claim 7, wherein the first and second commutators are disposed on opposite sides of the coil assembly.

11. The system of claim 1, wherein the first commutator has a first outer diameter and the second commutator has a second outer diameter, wherein the first outer diameter is larger than the second outer diameter.

12. The system of claim 1, wherein a first current provided to concurrently energize the first pair and second pair of brushes is half of a second current provided to energize only one of the first pair or the second pair of brushes.

13. The system of claim 1, wherein the coil assembly comprises a plurality of coils, and
   wherein the coil assembly is configured such that all of the plurality of coils are energized based on only one of the first pair of brushes or the second pair of brushes being energized by one of the first controller or the second controller.

14. The system of claim 1, wherein the coil assembly comprises a plurality of coils, and
   wherein the coil assembly is configured such that less than all of the plurality of coils are energized based on only one of the first pair of brushes or the second pair of brushes being energized by one of the first controller or the second controller.

* * * * *